United States Patent [19]

Fava

[11] 4,287,314

[45] Sep. 1, 1981

[54] MALEIMIDE-STYRENE COPOLYMER BLEND WITH POLYURETHANE

[75] Inventor: Ronald A. Fava, Monroeville, Pa.

[73] Assignee: Arco Polymers, Inc., Philadelphia, Pa.

[21] Appl. No.: 184,502

[22] Filed: Sep. 5, 1980

[51] Int. Cl.[3] .................... C08L 75/04; C08L 75/06
[52] U.S. Cl. .................................................. 525/130
[58] Field of Search ........................................ 525/130

[56] References Cited

U.S. PATENT DOCUMENTS

| | | | |
|---|---|---|---|
| 3,179,716 | 4/1965 | Brvin | 525/130 |
| 3,385,909 | 5/1968 | Haag | 525/130 |
| 3,426,099 | 2/1969 | Freifeld | 525/130 |

Primary Examiner—Paul Lieberman
Attorney, Agent, or Firm—John R. Ewbank

[57] ABSTRACT

An advantageous blend suitable for compression molding, injection molding, or general molding of plastic articles is prepared by mechanically mixing at an elevated controlled temperature a polyurethane resin and a resin derived from copolymerization maleimide and styrene.

3 Claims, No Drawings

MALEIMIDE-STYRENE COPOLYMER BLEND WITH POLYURETHANE

PRIOR ART

Polyurethane resin has been molded for the production of articles requiring resilience or elasticity, but relatively little development work has been concerned with blends comprising significant proportions of polyurethane resin.

The copolymer of styrene and maleimide has a softening point which is significantly higher than that for conventional polystyrene. Various proposals have been made for blends comprising the copolymer of styrene and maleimide. Fava U.S. Pat. No. 4,160,792 describes a multiple blend of polycarbonate and a copolymer of styrene and maleimide. Fava U.S. Pat. No. 4,122,130 describes multiple blends of polycarbonate and a copolymer of rubber, styrene, and maleimide. Fava U.S. Pat. No. 4,129,164 describes a thermoplastic molding composition blended from polymethyl methacrylate and a copolymer of rubber, styrene and maleimide. Fava U.S. Pat. No. 4,129,615 describes a plastic alloy comprising rubber modified styrene maleic imide, and a copolymer of styrene and methyl methacrylate.

Di Guilio U.S. Pat. No. 3,998,907 describes the preparation of resins comprising maleimide from corresponding resins derived from maleic anhydride precursor by subjecting the styrene resin containing maleic anhydride to treatment with ammonia or a primary amine.

Diisocyanates can react with diols to produce thermoplastic polyurethanes, some of which have significant elasticity. Such thermoplastic polyurethanes also have an advantageous combination of tensile strength, low temperature flexibility, and abrasion resistance. However, thermoplastic urethane responds unsatisfactorily to the processing (e.g. film forming, injection molding, etc) of conventional plastics. Only by blending thermoplastic polyurethane into an appropriate plastic alloy is it feasible to achieve appropriate desiderata. Most mixtures of plastics are incompatible. Most plastics will not alloy with thermoplastic polyurethane. However, there has been a long standing and unmet demand for an inexpensive compatible blend of appropriate plastic and thermoplastic polyurethane.

Notwithstanding the significant amount of research work concerned with blends of thermoplastic resins, it was found that most blends of plastics are incompatible throughout a wide range of proportions. Moreover, only vague guidelines and no reliable rules have evolved in regard to the choice of components in seeking to prepare a compatible plastic alloy by blending a plurality of macromolecular resins.

Nowithstanding the abundance of literature pertinent to appropriate blends of resins, there continued to be a persistent demand for resin blends suitable for molding items at a convenient temperature and a failure by others to meet such demands satisfactorily.

SUMMARY OF INVENTION

In accordance with the present invention, an advantageous thermoplastic composition is prepared by heat blending a polyurethane resin and a resin derived from styrene and maleimide. The weight concentration of each of the components of such blending must be within a range from 40% to 60%.

DETAILED DESCRIPTION

The invention is further clarified by reference to several examples. EXAMPLES 1-3

Thermoplastic polyurethanes are described in Wolf et al U.S. Pat. No. 3,929,928 (assigned to Uniroyal) derived from Ser. No. 345,923 filed Mar. 29, 1973, corresponding to Candaian Patent No. 1,003,991 of Jan. 18, 1977, and in "Polyurethane Technology" by Bruns, Interscience pp 198-200 and 1968 Modern Plastics Encyclopedia p 289.

Tetramethylene glycol is esterified with adipic acid to provide a polyester glycol. A thermoplastic polyurethane is prepared by reacting said polyester glycol with an equimolar amount of a diisocyanate such as MDI following the procedures of Schollenberger et al, Rubber Chemistry and Technology, Vol 35, pp 742 (1962). Commercially available thermoplastic polyurethanes complying with this description include Estane, Texin 80A, and Roylar E-9. Such thermoplastic polyurethanes can be described as reaction products of a polymeric polyol (e.g. a polyester glycol or a polyether glycol) with an organic diisocyanate (whether aromatic, aliphatic, or cycloaliphatic), frequently along with a low molecular weight bifunctional material having two reactive hydrogens, such as a glycol or diamine. Such thermoplastic polyurethanes have no available —NCO groups and no olefin unsaturation. The examples herein featured the use of Roylar E-9 brand of thermoplastic polyurethane.

A blend is prepared using an extruder adapted to recycle a significant portion (about ⅔) of the mixture approaching the exit orifices, with the extrusion of only about one third of the blend approaching the orfices, so that the components are blended under heat, pressure, and mechanical mixing far better than would normally occur in a conventional extruder lacking such recycling. A molding composition is prepared by mixing equal parts of polyurethane resin (Roylar E-9) and a resin prepared by the copolymerization of styrene and a maleimide component. The copolymer contained about 8% maleimide and about 92% styrene. Maleic anhydride can be treated with ammonia to prepare maleimide, which can be copolymerized with styrene to prepare the copolymer of styrene and a maleimide component. Alternatively, a styrene maleic anhydride resin containing about 8% MA can be imidized by the method of said Di Guilio U.S. Pat. No. 3,998,907 to provide a styrene-maleimide copolymer.

Articles were compression molded from several compositions using compression molding components to obtain samples having the following properties:

| Control or Example | Izod (ft. lb/inch) | Vicat (1° F.) |
|---|---|---|
| A SMI | 0.2 | 259 |
| 1 50/50 blend | 2.5 | 243 |
| 2 40 PU/60SMI | 0.5 | 243 |
| 3 60 PU/40S | 3.4 | 241 |

By a series of tests it is established that articles made by molding the blend of 40% to 60% of the styrene maleimide and 40% to 60% polyurethane resin had an attractive combination of properties. Moreover, the properties for the blend are superior to those of the blend of polyurethane resin with a copolymer of styrene and 8% maleic anhydride. The utilization of the imide instead of the anhydride makes feasible the attainment of an advantageous combination of properties.

In controls using 10, 20, and 30% polyurethane in blends with styrene maleimide, the compression molded articles were excessively brittle and had Izod strengths of about 0.2 ft lb/inch. Similarly controls using 70, 80, and 90% polyurethane proved to be less attractive than the pure polyurethane, thus focusing attention upon the advantageous combination of properties of the blends in the 40–60% range.

EXAMPLES 4–5

Blends were injection molded to provide articles having an advantageous combination of properties. Data relating to tests upon the thus prepared samples include:

| Control | Example | Weight Percentages | | Izod (ft.lb/in) | Vicat (1° F.) | Tensile | | |
|---|---|---|---|---|---|---|---|---|
| | | poly- ure- thane | styrene- maleim- ide | | | mod ($10^3$ psi) | str (psi) | E- long (%) |
| B | | 0 | 100 | 0.2 | 264 | 540 | 7600 | 2 |
| | 4 | 40 | 60 | 0.6 | 230 | 220 | 3800 | 140 |
| | 5 | 60 | 40 | 9.3 | 216 | 70 | 2700 | 150 |
| C | | 100 | 0 | | | 7 | 3900 | 820 |

By a series of tests it is shown that blends of equal parts by weight of the polyurethane and styrene maleimide are prepared, and that the desirable blends must be within the 40% to 60% range, based upon the resin content as 100%. To the extend that pigments, fillers, reinforcements, etc. are employed, they are deemed in addition to the macromolecular organic structural material (i.e. resin) content.

PERTINENT LIMITS TO INVENTION

By a series of tests it is established that the articles prepared from mixtures containing from 40% to about 60% of the polystyrene maleimide resin, the balance being polyurethane resin have advantages resembling those outlined for the 50/50% composition. By a series of tests it is established that the styrene-maleimide resin should contain from about 5% to about 35% of maleimide desirably from about 7% to about 14%. The invention features the blending of such styrene-maleimide resin with polyurethane, proportions being from about 40% to 60% by weight for each resin.

Various modification of the invention are possible without departing from the scope of the appended claims.

The invention claimed is:

1. A thermoplastic composition for molding of plastic articles consisting of a blend of
   A. polyurethane
   B. a resin containing 5 to 35% maleimide and 65 to 95% styrene each of components A and B being present in a weight concentration within a range from 40% to 60%.

2. The thermoplastic composition of claim 1 in which the resin contains 7 to 14% maleimide.

3. The thermoplastic composition of claim 1 in which the resin B contains about 8% maleimide.

* * * * *